United States Patent
Deneszczuk et al.

(10) Patent No.: US 10,233,980 B2
(45) Date of Patent: Mar. 19, 2019

(54) SPRING PACK ASSEMBLY FOR A TORQUE TRANSMITTING DEVICE

(71) Applicant: GM Global Technology Operations LLC, Detroit, MI (US)

(72) Inventors: Gregory W. Deneszczuk, Royal Oak, MI (US); Joaquin J. Affonso, III, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 149 days.

(21) Appl. No.: 15/377,386

(22) Filed: Dec. 13, 2016

(65) Prior Publication Data

US 2018/0163794 A1 Jun. 14, 2018

(51) Int. Cl.
*F16D 25/12* (2006.01)
*F16D 25/0638* (2006.01)
*F16F 1/12* (2006.01)
*F16D 127/02* (2012.01)

(52) U.S. Cl.
CPC .......... *F16D 25/12* (2013.01); *F16D 25/0638* (2013.01); *F16D 2127/02* (2013.01); *F16F 1/12* (2013.01)

(58) Field of Classification Search
CPC ........ F16D 25/0638; F16D 25/12; F16F 1/12; F16F 1/128; F16F 3/04; F16F 2230/0052
See application file for complete search history.

(56) References Cited

U.S. PATENT DOCUMENTS

| 3,313,385 | A | * | 4/1967 | Forster | F16D 25/0638 192/109 B |
| 3,782,708 | A | * | 1/1974 | Dulude | B23P 19/048 192/89.26 |
| 3,891,823 | A | * | 6/1975 | Dulude | B23P 11/00 219/153 |
| 4,724,941 | A | * | 2/1988 | Wirkner | F16D 25/0638 192/109 F |
| 5,772,191 | A | * | 6/1998 | Nakano | F16F 1/122 267/179 |
| 5,992,834 | A | | 11/1999 | Dover et al. | |

(Continued)

FOREIGN PATENT DOCUMENTS

DE 102013221181 B4 9/2014

*Primary Examiner* — David R Morris

(57) ABSTRACT

A torque transmitting device having a spring pack assembly, includes a first spring retainer ring abutting a hydraulically actuated piston, a second spring retainer ring abutting a piston housing, and a plurality of coiled springs biasing the first spring retainer ring apart from the second retainer ring, thereby urging the hydraulically actuated piston slideably apart from the fixed piston housing. A composite spring support ring is coaxially disposed between the first spring retainer ring and the second spring retainer ring. The spring support ring includes cylindrical walls defining cylindrical passageways configured to receive the coiled springs. Each of the cylindrical passageway includes include a diameter (d) that is sufficiently narrow such that the cylindrical wall completely surrounds the mid-portion of the coiled spring thus preventing the coiled spring from bending lengthwise, but sufficiently wide such that the coiled spring does not saw into the cylindrical walls.

18 Claims, 3 Drawing Sheets

(56) References Cited

U.S. PATENT DOCUMENTS

| | | | | |
|---|---|---|---|---|
| 6,575,439 B1* | 6/2003 | Costello | ................ | F16F 1/128 |
| | | | | 267/179 |
| 6,920,970 B1* | 7/2005 | Dumas | ................ | F16D 25/0638 |
| | | | | 192/70.2 |
| 6,964,412 B2* | 11/2005 | Costello | ................ | F16B 21/071 |
| | | | | 267/179 |
| 6,966,549 B2* | 11/2005 | Costello | ................ | F16B 21/071 |
| | | | | 267/179 |
| 7,021,610 B2* | 4/2006 | Costello | ................ | F16B 21/071 |
| | | | | 267/179 |
| 8,256,600 B2 | 9/2012 | Reed et al. | | |
| 8,511,450 B2* | 8/2013 | Gold | ................ | F16D 25/0638 |
| | | | | 192/106 F |
| 8,991,583 B2 | 3/2015 | Dwenger | | |
| 9,074,642 B2* | 7/2015 | McFarland | ........ | F16H 63/3026 |
| 9,416,836 B2* | 8/2016 | Fueki | ................ | F16D 25/12 |
| 9,581,209 B2* | 2/2017 | Kramm | ................ | F16D 25/0638 |
| 9,599,169 B2* | 3/2017 | Saito | ................ | F16D 25/10 |
| 9,909,630 B1* | 3/2018 | Lint | ................ | F16D 25/10 |
| 2004/0104523 A1* | 6/2004 | Costello | ................ | F16B 21/071 |
| | | | | 267/89 |
| 2004/0212131 A1* | 10/2004 | Costello | ................ | F16B 21/071 |
| | | | | 267/80 |
| 2004/0214475 A1* | 10/2004 | Costello | ................ | F16B 21/071 |
| | | | | 439/700 |
| 2004/0217528 A1* | 11/2004 | Costello | ................ | F16B 21/071 |
| | | | | 267/179 |
| 2009/0235815 A1* | 9/2009 | Nishimura | ........ | F16D 25/0638 |
| | | | | 92/240 |
| 2011/0031086 A1* | 2/2011 | Reed | ................ | F16D 25/0638 |
| | | | | 192/70.27 |
| 2011/0073434 A1* | 3/2011 | Gold | ................ | F16D 25/0638 |
| | | | | 192/85.01 |
| 2013/0277168 A1* | 10/2013 | Dwenger | ........ | F16D 13/71 |
| | | | | 192/89.26 |
| 2013/0334750 A1* | 12/2013 | Fueki | ................ | F16D 25/12 |
| | | | | 267/179 |
| 2014/0110214 A1* | 4/2014 | McFarland | ........ | F16H 63/3026 |
| | | | | 192/109 F |
| 2015/0240887 A1* | 8/2015 | Kramm | ................ | F16D 25/0638 |
| | | | | 192/101 |
| 2015/0260237 A1* | 9/2015 | Saito | ................ | F16D 25/10 |
| | | | | 192/48.619 |
| 2016/0215831 A1* | 7/2016 | Ito | ................ | F16D 25/0638 |
| 2018/0051756 A1* | 2/2018 | Lint | ................ | F16D 25/10 |

* cited by examiner

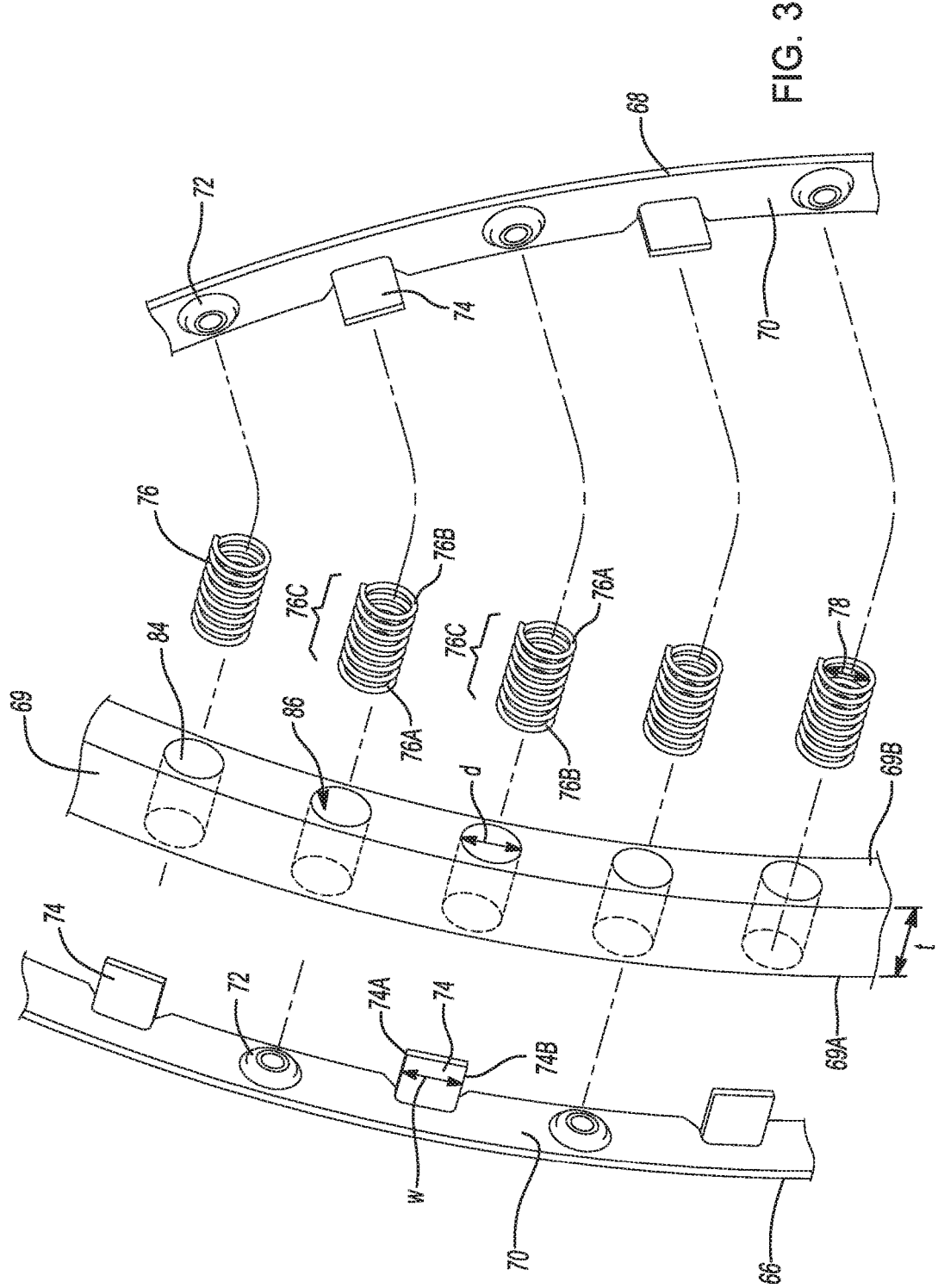

SPRING PACK ASSEMBLY FOR A TORQUE TRANSMITTING DEVICE

INTRODUCTION

The present disclosure relates to a torque transmitting device for an automatic transmission, and more particularly to a spring pack assembly for the torque transmitting device.

BACKGROUND

Automatic transmissions for motor vehicles commonly employ torque transmitting devices for the selective transmission of torque between transmission components. For example, hydraulically actuated friction clutches are used to hold and release elements of a planetary gear set in order to produce the various gear ratios required for the operation of the motor vehicle. A hydraulically actuated clutch typically includes a hydraulic piston housing, a hydraulically actuated piston disposed within the hydraulic piston housing for selectively engaging a multi-plate clutch pack, and a return spring pack assembly for urging the hydraulically actuated piston apart from the multi-plate clutch pack.

A typical return spring pack assembly includes a plurality of coiled springs retained between the two co-axially located spring retainer plates. The coiled springs are evenly angularly spaced on the spring retainer plates. Each of the coiled springs includes a length relatively larger than the diameter of spring. During high speed rotation of the return spring pack assembly about a rotational axis, the centrifugal forces distort and deform the coiled spring by bowing the length of the coiled spring radially outward with respect to the rotational axis.

The deformation of the plurality of springs bowing radially outward causes compression instability which may result in a variable spring constant. The variable spring constant may produce a variable and unpredictable force in the opposition to the hydraulic force that actuates the piston to engage the multi-plate clutch pack. In addition, the instability deformation of the springs may clause excessive wear of the multi-plate clutch pack because the clutch plates are not fully engaged resulting in slipping of the clutch plates, and possible instability of the overall clutch assembly.

Thus, there is a need for an improved return spring pack assembly that reduces or eliminate the deformation of the coil spring due to centrifugal forces.

SUMMARY

According to an aspect of the disclosure, a spring pack assembly for a torque transmitting device is provided. The spring pack assembly includes a first spring retainer ring disposed about an axis, a second spring retainer ring coaxially disposed adjacent the first retainer ring, a plurality of coiled springs abutting the first and second spring retainer rings, and a spring support ring coaxially disposed between the first spring retainer ring and the second spring retainer ring. Each of the coiled springs includes a first end, a second end, and a mid-portion extending between the first and second spring ends. The spring support ring is configured to support the coiled springs such that the mid-portions of the coiled springs are prevented from bending lengthwise.

In another aspect of the present disclosure, the spring support ring includes a plurality of cylindrical walls defining a plurality of cylindrical passageways configured to receive the plurality of coiled springs, wherein each of the cylindrical passageway includes include a diameter (d) that is sufficiently narrow such that the cylindrical wall completely surrounds the mid-portion of the coiled spring thus preventing the coiled spring from bending lengthwise, but sufficiently wide such that the repeated compression and restoration cycle of the coiled spring does not saw into or otherwise erode the cylindrical walls.

In another aspect of the present disclosure, the spring support ring includes a thickness (t) less than the inactive or free-condition length of the coiled springs, thereby defining a first annular space and a second annular space between the spring support ring and first and second spring retainer rings, respectively.

In another aspect of the present disclosure, the first spring retainer ring further include a plurality of evenly angularly spaced spring support surfaces extending radially in a plane perpendicular to the axis and a plurality of tabs interposed between the spring support surfaces.

In another aspect of the present disclosure, the spring support ring is formed of a composite material having a polyphthalamide (PPA) and 30% by weight glass.

According to several aspects, a return spring pack assembly for a torque transmitting device is also provided. The return spring pack assembly includes a first spring retainer ring disposed about an axis, a second spring retainer ring disposed coaxially with the first spring retainer ring, a plurality of coiled springs abutting the first and second spring retainer plates, and a spring support ring coaxially disposed between the first and second spring retainer rings. The spring support ring includes a plurality of cylindrical walls defining a plurality of cylindrical passageways configured to receive the plurality of coiled springs such that the coiled springs are supported from bending in a lengthwise direction.

In an additional aspect of the present disclosure, each of the cylindrical passageway includes include a diameter (d) that is sufficiently narrow such that the cylindrical wall completely surrounds the mid-portion of the coiled spring to support the coiled spring from bending lengthwise into a bow shape, but sufficiently wide such that the repeated compression and restoration cycle of the coiled spring does not saw into or otherwise erode the cylindrical walls.

In another aspect of the present disclosure, the spring support ring includes a thickness (t) less than the inactive or free-condition length of the coiled springs, thereby defining a first annular space and a second annular space between the spring support ring and the first and second spring retainer rings, respectively. The spring support ring is formed of a plastic composite material including a polyphthalamide (PPA).

According to several aspects, a torque transmitting device is also provided. The torque transmitting device includes a clutch housing, a hydraulically actuated piston slideably disposed within the clutch housing, a piston housing fixedly disposed within the clutch housing on the interconnecting member and adjacent the hydraulically actuated piston, and a spring pack assembly. The spring pack assembly includes a first spring retainer ring abutting the hydraulically actuated piston, a second spring retainer ring abutting the piston housing, a plurality of coiled springs biasing the first spring retainer ring apart from the second retainer ring, thereby urging the hydraulically actuated piston slideably apart from the fixed piston housing. A spring support ring is disposed between the first and second spring retainer rings. The spring support ring is configured to support the plurality of coiled springs by maintaining the coiled springs in a predetermined configuration between the first and second spring retainer rings and preventing the coiled springs from bending along the lengths of the springs.

In an additional aspect of the present disclosure, the spring support ring includes a plurality of cylindrical walls defining a plurality cylindrical passageways configured to receive the coiled springs. The cylindrical walls are configured to support the mid-portions of the coiled springs. Each of the cylindrical passageway includes include a diameter (d) that is sufficiently narrow such that the cylindrical wall completely surrounds the mid-portion of the coiled spring to support the coiled spring from bending lengthwise into a bow shape due to centrifugal forces. The diameter (d) is also sufficiently wide such that the repeated compression and restoration cycle of the coiled spring does not saw into or otherwise erode the cylindrical walls.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a detailed exploded view of the spring pack assembly of FIG. 2 in region 3.

DETAILED DESCRIPTION

The following description is merely exemplary in nature and is not intended to limit the present disclosure, application, or uses.

Figure 1:
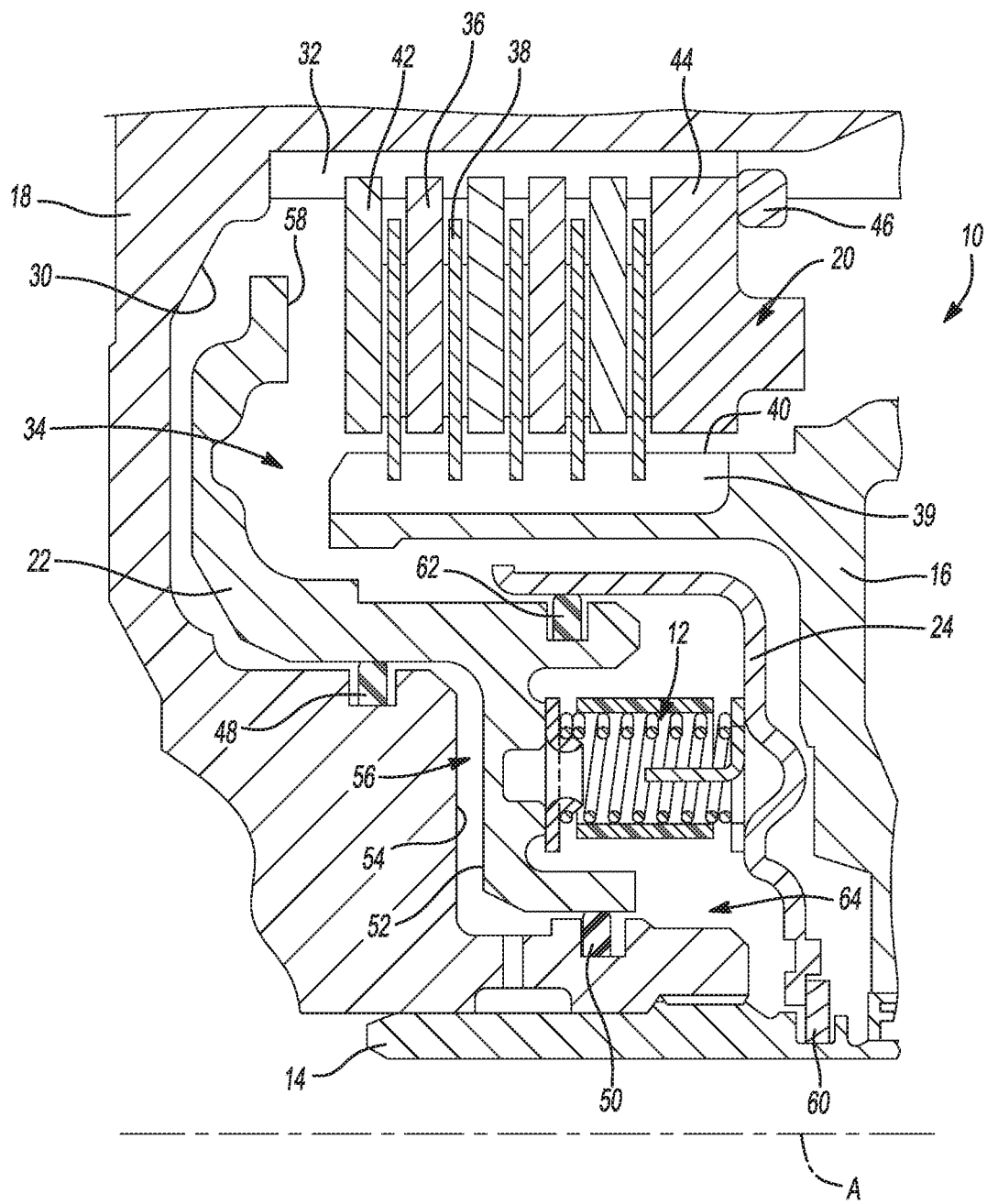
FIG. 1 is a cross-sectional view of a hydraulically actuated torque transmitting device having a spring pack assembly according to an exemplary embodiment.

Referring to the drawings, wherein like reference numbers refer to like components, FIG. 1 shows a cross-sectional view of a torque transmitting device 10 having a return spring pack assembly 12 used in a transmission (not shown) for a motor vehicle. The transmission may be that of a variable diameter pulley or sheave drive continuously variable transmission (CVT), a multi-speed planetary gear set automatic transmission, or a manual transmission without departing from the scope of the invention. The exemplary torque transmitting device 10 depicted is that of a hydraulically actuated piston multi-plate friction clutch. It should be appreciated that the torque transmitting device 10 may be that of a hydraulically actuated piston dog clutch, cone clutch, plate clutch, or other torque transmitting device having a return spring pack assembly 12 without departing from the scope of the invention.

Referring to FIG. 1, the components of the torque transmitting device 10 are arranged symmetrically about a longitudinal axis (A); however, only those components above the longitudinal axis (A) are shown in FIG. 1. The torque transmitting device 10 is configured to selectively transmit torque from a first interconnecting member 14 to a second interconnecting member 16 of the transmission. The interconnecting members 14, 16 may be connected to rotating components of the transmission such as input/out shafts, and elements of planetary gear sets, or to stationary components such as the transmission housing. The torque transmitting device 10 includes a clutch housing 18, a multi-plate friction clutch pack 20, a hydraulic piston 22, a piston housing 24, and the return spring pack assembly 12.

In the example shown, the clutch housing 18 is connected to the first interconnecting member 14 for common rotation about the longitudinal axis (A). The clutch housing 18 includes an interior surface 30 defining a splined portion 32 and a piston chamber 34. The multi-plate friction clutch pack 20 includes a plurality of axially moveable first clutch plates 36 mounted on the spline portion 32 of the clutch housing 18 and a plurality of axially moveable second clutch plates 38 disposed on a spline 39 defined on an exterior surface 40 of the second interconnecting member 16. The first clutch plates 36 are interleaved with the second clutch plates 38. Both the first and second clutch plates 36, 38 are sandwiched between an axially moveable first end plate 42 mounted on the spline portion 32 of the clutch housing 18 and a second end plate 44. The second end plate 44 is axially fixed on the spline portion 32 by a retainer ring 46.

The hydraulic piston 22 is disposed within the piston chamber 34 and is in sliding contact with a first hydraulic seal 48 and a second hydraulic seal 50 provided on the interior surface 30 of the clutch housing 18 for axial movement relative to the axis (A). The hydraulic piston 22 includes an outer surface 52 facing a rear portion 54 of interior surface 30 of the clutch housing 18 between the first and second hydraulic seals 48, 50. A first hydraulic chamber 56 is defined between the rear portion 54 of the interior surface 30 of the clutch housing 18 and the outer surface 52 of the hydraulic piston 22 between the first and second hydraulic seals 48, 50. The hydraulic piston 22 includes a distal end 58 configured to selectively engage and transmit an axial force against the first end plate 42 of the multi-plate clutch pack 20.

The piston housing 24 is disposed within the piston chamber 34 and is fixedly retained in position on the first interconnecting member 14 by a retainer ring 60 for common rotation with the first interconnecting member 14 and clutch housing 18. A third hydraulic seal 62 is disposed between the piston housing 24 and the hydraulic piston 22 such that the hydraulic piston 22 is axially moveable within the piston housing 24 while the piston housing 24 remains fixed in the axial direction. A second hydraulic chamber 64 is defined between the hydraulic piston 22 and the piston housing 24.

The spring pack assembly 12 is disposed within the second hydraulic chamber 64 and is in contact with the hydraulic piston 22 and the piston housing 24. The spring pack assembly 12 is configured to axially bias the hydraulic piston 22 apart from the axially fixed piston housing 24 such that the distal end 58 of the hydraulic piston 22 is not in contact with the first end plate 42.

The first hydraulic chamber 56 and the second hydraulic chamber 64 are hydraulically connected to a transmission hydraulic circuit (not shown). When the torque transmitting device 10 rotates about the longitudinal axis (A), the centrifugal force develops a pressure head within the clutch housing 18. This pressure head develops a static force of substantial equal magnitude on opposite sides of the hydraulic piston 22, thereby balancing the effect of centrifugal force. Upon selective pressurization of the first hydraulic chamber 56, the hydraulic pressure actuates the hydraulic piston 22 by urging the hydraulic piston 22 axially towards the piston housing 24 and the distal end 58 against the first end plate 42, thereby compressing the multi-plate friction clutch pack 20.

As the distal end 58 of hydraulic piston 22 is urged against the first end plate 42, the second end plate 44 constraints the clutch plates 36, 38 from moving axially, thereby compressing the clutch plates 36, 38 together. The compression of the clutch plates 36, 38 creates friction to restrict the relative movement between the clutch plates 36, 38, thereby rotationally locking the first interconnecting member 14 to the second interconnecting member 16. When the hydraulic pressure in the first hydraulic chamber 56 is reduced, the spring pack assembly 12 restores the hydraulic piston 22 by urging the hydraulic piston 22 apart from the piston housing 24 and the distal end 58 apart from the first end plate 42, thereby unrestricting the relative movement between the first clutch plates 36 and second clutch plates 38, thus unlocking the first interconnecting member 14 from the second interconnecting member 16.

Figure 2:
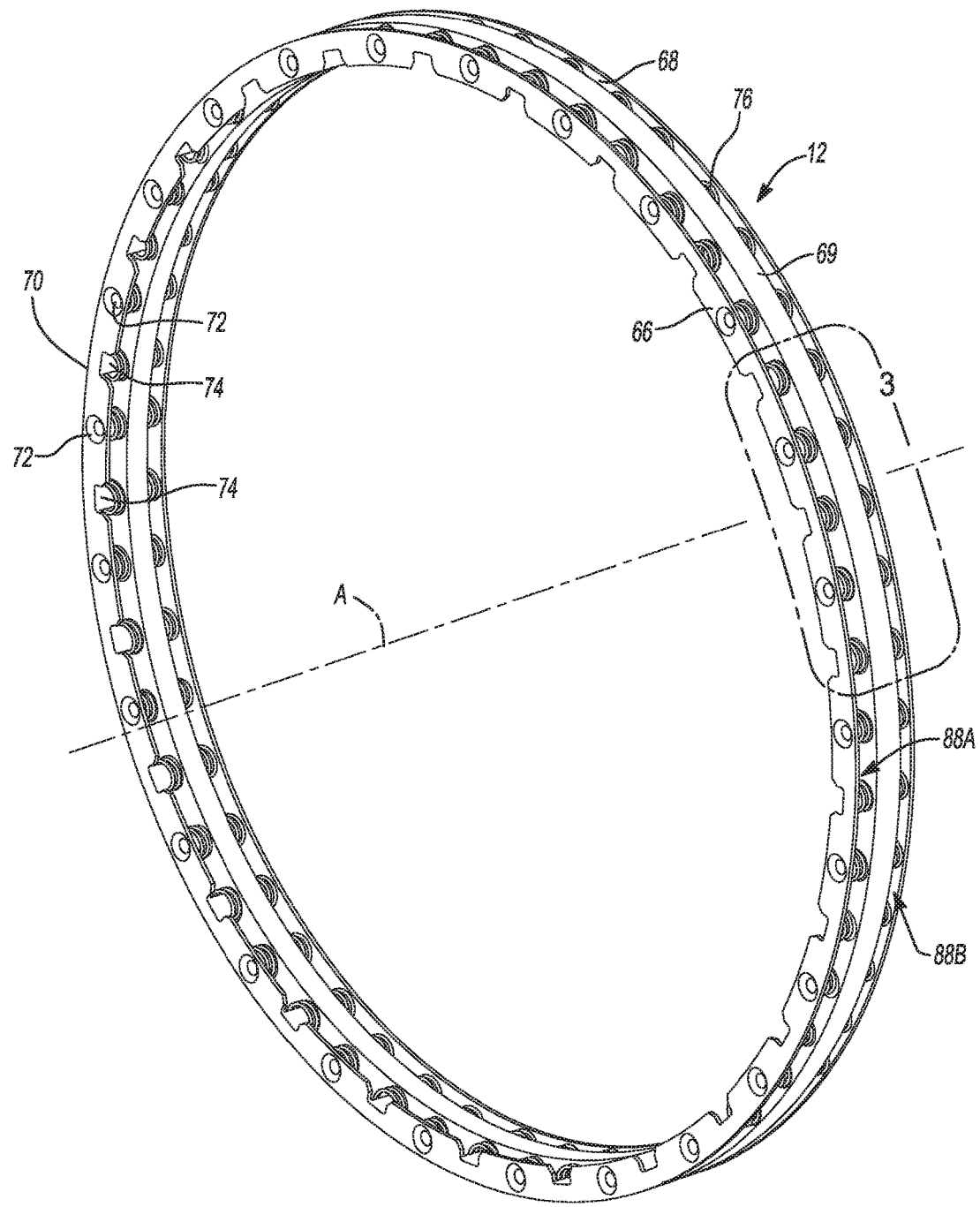
FIG. 2 is a perspective view of the spring pack assembly of FIG. 1 according to an exemplary embodiment.

Referring to FIG. 2, a perspective view of the spring pack assembly 12 for the torque transmitting device 10 is illustrated and will now be described. The spring pack assembly 12 includes a first spring retainer ring 66 and a second spring retainer ring 68 coaxially disposed about the axis (A). Coaxially disposed between the first spring retainer ring 66 and the second spring retainer ring 68 is a composite spring support ring 69. The composite spring support ring 69 is configured to support a plurality of coiled springs 76 by maintaining the coiled springs 76 in a predetermined configuration between the first and second spring retainer rings 66, 68 and preventing the coiled springs 76 from deforming into a bow-like shape due to centrifugal forces generated during the normal operations of the torque transmitting device 10.

Each of the spring retainer rings 66, 68 include a plurality of spring support surfaces 70 extending radially parallel to a plane perpendicular to the axis (A). The spring support surfaces 70 are distributed at equal angular intervals about the axis (A). Each of the spring support surfaces 70 includes a boss 72. Interposed between each support surface are tabs 74 extending perpendicular to the support surfaces 70 and parallel to the axis (A). The first spring retainer ring 66 is positioned with respect to the second retainer ring 68 such that the tabs 74 of one the first and second spring retainer rings 66, 68 are aligned with bosses 72 of the other first and second spring retainer rings 66, 68.

Referring to FIG. 3, an exploded detailed view of the region 3 of FIG. 2 is illustrated and will now be described. Each of the coiled springs 76 include a first end 76A, an opposite second end 76B, and a mid-portion therebetween 76C. The first ends 76A of the coiled springs 76 are fitted over the bosses 72 on the spring support surfaces 70 of the spring retainer rings 66, 68. Each of the bosses 72 is sufficiently wide to fit against the interior diameter 78 of the first end 76A of the coiled spring 76 to locate the spring 76 onto the support surface 70. The opposite second ends 76B of the coiled springs 76 are fitted over the tabs 74 of the spring retainer rings 66, 68. Each of the coiled springs 76 include an inactive or free-condition length defined between the first end 76A and the second end 76B when the spring pack assembly 12 is assembled into the torque transmitting device 10 and the hydraulic piston 22 is not actuated to engage the clutch pack 20.

Each of the tabs 74 includes a width (W) defined between two edge surfaces 74A, 74B. The tab 74 extends approximately midway through the inactive or free-condition length of each of the coiled springs 76. The width (W) of the tab 74 is sufficiently wide such that the edge surfaces 74A, 74B cooperates with the inner diameter 78 of the coiled spring 76 to maintain the position of the coiled spring 76 between the first and second spring retainer rings 66, 68 without significantly interfering with the spring constant of the coiled spring 76.

The spring support ring 69 includes a plurality of cylindrical walls 84 defining a plurality of cylindrical passageways 86 configured to receive the plurality of coiled springs 76. Each of the cylindrical passageway 86 includes include a diameter (d) that is sufficiently narrow such that the cylindrical wall 84 completely surrounds the exterior surface of the mid-portion 76C of the coiled spring 76 to support the coiled spring 76 from bending lengthwise into a bow shape, but sufficiently wide such that the repeated compression and restoration cycle of the coiled spring 76 does not saw into or otherwise erode the cylindrical walls 84.

The spring support ring 69 also includes a first surface 69A oriented toward the first spring retainer ring 66 and a second surface 69B oriented toward the second spring retainer ring 68. The spring support ring 69 includes a thickness (t) defined between the first surface 69A and the second surface 69B. Best shown in FIG. 2, the thickness (t) is less than the inactive or free-condition length of the coiled springs 76, thus defining a first annular space 88A and a second annular space 88B between the spring support ring 69 and first and second spring retainer rings 66, 68, respectively. The first and second annular spaces 88A, 88B allow for the compression of the spring pack assembly 12 without unduly compressing the spring support ring 69 upon selective actuation of the hydraulic piston 22.

The spring support ring 69 displaces a volume of hydraulic transmission oil between the first and second spring retainer rings 66, 68. The net effect is a reduction of hydraulic transmission oil required to fill the second hydraulic chamber 64, which must be full for proper functioning of the torque transmitting device 10. The lower volume of oil required in the second hydraulic chamber 64 helps reduce fill time as well as makes the displaced hydraulic oil available for elsewhere in the transmission resulting in higher efficiency, potentially smaller pump requirement, etc.

In an alternative embodiment of the spring pack assembly 12, the first and second spring retainer rings 66, 68 do not include bosses 72 defined on the spring support surfaces 70, and/or tabs 74 interposed between the spring support surfaces 70. The plurality of coiled springs 76 are maintained in a predetermined configuration between the first and second spring retainer rings 66, 68 solely by the spring support ring 69, which also prevents the coiled springs 76 from deforming into a bow-like shape due to centrifugal forces generated during the normal operations of the torque transmitting device 10.

The various components of the spring pack assembly 12 can be made from any suitable material and by any suitable process. For example, the clutch housing 18, hydraulic piston 22, piston housing 24, and spring retainer rings 66, 68 can be machined, die casted, or molded from a suitable metallic material. The hydraulic piston 22 and piston housing 24 can be attached to the clutch housing 18 by any suitable process, such as, for example, welding. Similarly, the coiled springs 76 as well as the other components associated with the spring retainer assembly 12 can be formed by any suitable process, such as, for example, rolling, forging, machining, or die casting. The spring support ring 69 may be manufactured of a plastic composite material. The plastic composite material may include a polyphthalamide (PPA) and glass, preferably 30 percent by weight glass. The plastic composite material may have a density of approximately 40% greater than the density of the hydraulic transmission oil.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A spring pack assembly, comprising:
   a first spring retainer ring disposed about an axis;
   a second spring retainer ring coaxially disposed adjacent the first retainer ring;
   a plurality of coiled springs abutting the first and second spring retainer rings, wherein each of the coiled springs includes a first end, a second end, and a mid-portion extending between the first and second spring ends; and
   a spring support ring coaxially disposed between the first spring retainer ring and the second spring retainer ring, wherein the spring support ring is configured to support the coiled springs such that the mid-portions of the coiled springs are prevented from bending lengthwise, wherein the spring support ring includes a plurality of cylindrical walls defining a plurality of cylindrical passageways configured to receive the plurality of coiled springs, wherein each of the cylindrical passageway includes a diameter (d) that is sufficiently narrow such that the cylindrical wall prevents the coiled spring from bending lengthwise, but sufficiently wide such that a repeated compression and restoration cycle of the coiled spring does not saw into or otherwise erode the cylindrical walls.

2. The spring pack assembly of claim 1, wherein the spring support ring completely surrounds exterior surfaces of the mid-portions of the coiled springs.

3. The spring pack assembly of claim 2, wherein the spring support ring includes a thickness (t) less than an inactive or free-condition length of the coiled springs, thereby defining a first annular space and a second annular space between the spring support ring and the first and second spring retainer rings, respectively.

4. The spring pack assembly of claim 3, wherein the first spring retainer ring includes a plurality of spring support surfaces extending radially in a plane perpendicular to the axis, wherein the spring support surfaces are evenly angularly spaced about the axis.

5. The spring pack assembly of claim 4, wherein the first spring retainer ring includes a plurality of tabs extending parallel to the axis, wherein the axially extending tabs are interposed between the radially extending spring support surfaces.

6. The spring pack assembly of claim 5, wherein each of the plurality of tabs extends through a respective coiled spring.

7. The spring pack assembly of claim 3, wherein the spring support ring is formed of a plastic composite material.

8. The spring pack assembly of claim 7, wherein the plastic composite material further includes a polyphthalamide (PPA).

9. The spring pack assembly of claim 8, wherein the plastic composite material further includes 30% by weight glass.

10. A return spring pack assembly for a torque transmitting device, comprising:
    a first spring retainer ring disposed about an axis;
    a second spring retainer ring disposed coaxially with the first spring retainer ring;
    a plurality of coiled springs abutting the first and second spring retainer rings, each of the coiled springs includes a first end, an opposite second end, and a mid-portion therebetween; and
    a spring support ring coaxially disposed between the first and second spring retainer rings;
    wherein the spring support ring includes a plurality of cylindrical walls defining a plurality of cylindrical passageways configured to receive the plurality of coiled springs such that the coiled springs are supported from bending in a lengthwise direction.

11. The return spring pack assembly of claim 10, wherein each of the cylindrical passageway includes a diameter (d) that is sufficiently narrow such that the cylindrical wall completely surrounds the mid-portion of the coiled spring to support the coiled spring from bending lengthwise, but sufficiently wide such that a repeated compression and restoration cycle of the coiled spring does not saw into or otherwise erode the cylindrical walls.

12. The return spring pack assembly of claim 11, wherein the first and second spring retainer rings include:
    a plurality of spring support surfaces extending radially in a plane perpendicular to the axis, wherein the spring support surfaces are evenly angularly spaced about the axis; and
    a plurality of tabs extending parallel to the axis, wherein the axially extending tabs are interposed between the radially extending spring support surfaces.

13. The return spring pack assembly of claim 12, wherein the spring support ring includes a thickness (t) less than an inactive or free-condition length of the coiled springs, thereby defining a first annular space and a second annular space between the spring support ring and the first and second spring retainer rings, respectively.

14. The return spring pack assembly of claim 12, wherein the spring support ring is formed of a composite material including a polyphthalamide (PPA).

15. A torque transmitting device, comprising:
    a clutch housing;
    a hydraulically actuated piston slideably disposed within the clutch housing;
    a piston housing fixedly disposed within the clutch housing on an interconnecting member and adjacent the hydraulically actuated piston; and
    a spring pack assembly having a first spring retainer ring abutting the hydraulically actuated piston, a second spring retainer ring abutting the piston housing, a plurality of coiled springs biasing the first spring retainer ring apart from the second retainer ring, thereby urging the hydraulically actuated piston slideably apart from the fixed piston housing, and a spring support ring disposed between the first and second spring retainer rings,
    wherein the spring support ring includes a plurality of cylindrical walls defining a plurality cylindrical passageways configured to receive the coiled springs, and wherein the cylindrical walls are configured to support mid-portions of the coiled springs, and
    wherein the spring support ring is configured to support the plurality of coiled springs by maintaining the coiled springs in a predetermined configuration between the first and second spring retainer rings and preventing the plurality of coiled springs from bending along the lengths of the coiled springs.

16. The torque transmitting device of claim 15, wherein each of the cylindrical passageway includes a diameter (d) that is sufficiently narrow such that the cylindrical wall completely surrounds the mid-portion of the coiled spring to support the coiled spring from bending lengthwise into a bow shape due to centrifugal forces.

17. The torque transmitting device of claim 16, wherein the diameter (d) is also sufficiently wide such that a repeated compression and restoration cycle of the coiled spring does not saw into or otherwise erode the cylindrical walls.

18. The torque transmitting device of claim 17, wherein the spring support ring is formed of a composite material having a density of approximately 40% greater than the density of a hydraulic transmission oil.

\* \* \* \* \*